United States Patent
Ettischer et al.

[15] 3,661,066
[45] May 9, 1972

[54] SELF-COCKING TWO BLADED PHOTOGRAPHIC SHUTTER

[72] Inventors: Helmut Ettischer, Ruit/Wurttemberg; Ernst Lieser, Stuttgard-Vaihingen, both of Germany

[73] Assignee: Eastman Kodak Company, Rochester, N.Y.

[22] Filed: Apr. 2, 1970

[21] Appl. No.: 25,202

[30] Foreign Application Priority Data
Apr. 5, 1969 Germany....................P 19 17 507.6

[52] U.S. Cl..................................95/60, 95/10 C, 95/53 EB
[51] Int. Cl. .........................................................G03b 9/10
[58] Field of Search ................................95/60, 10 C, 53 R

[56] References Cited
UNITED STATES PATENTS

| | | | |
|---|---|---|---|
| 3,545,352 | 12/1970 | Bellows | 95/10 C |
| 3,459,112 | 8/1969 | Starp et al | 95/60 |
| 2,731,895 | 1/1956 | McKee | 95/60 |

Primary Examiner—Joseph F. Peters, Jr.
Attorney—Robert W. Hampton and Douglas I. Hague

[57] ABSTRACT

A self-cocking shutter including two blades, each of which is movable between first and second positions. The blades are positioned by springs which are arranged so that their forces do not act against each other. One spring moves a first shutter blade from its first to its second position and a second spring returns both of the shutter blades to their first positions.

10 Claims, 4 Drawing Figures

HELMUT ETTISCHER
ERNST LIESER
INVENTORS 3,661,066

SELF-COCKING TWO BLADED PHOTOGRAPHIC SHUTTER

BACKGROUND OF THE INVENTION

1. Field of the Invention

The invention relates to photographic apparatus and, more particularly, to an improved shutter mechanism employing spring actuated shutter blades.

2. Description of the Prior Art

Photographic cameras having two shutter blades which are actuated by return springs or restoring springs are well known in the art.

In one typical prior art camera, the shutter cocking operation cocks the restoring spring for a first shutter blade while the restoring spring for a second shutter blade remains ineffective. Upon release of the shutter to effect an exposure, the first shutter blade begins its rundown, which relieves the tension of its restoring spring and simultaneously cocks the restoring spring for the second shutter blade.

In another typical prior art device, the shutter cocking operation cocks a drive spring for the opening shutter blade but does not effect the return spring for the closing shutter blade. During the shutter rundown, the tension of the drive spring is relieved as it moves the opening shutter blade, and at the same time the return spring for the closing blade is cocked with the closing blade retained in its open position.

A problem with such prior art shutter devices is that the forces of the actuating springs work against each other, requiring springs of different strength which must be adjusted relative to each other. Such adjustment is difficult and good results are difficult to achieve. Two factors which contribute significantly to this difficulty of adjustment are friction forces and the need for consistent exposure times for any given level of scene illumination.

SUMMARY OF THE INVENTION

It is an object of the present invention to provide an improved shutter apparatus which is particularly adapted for control by an electronic timing apparatus.

Another object of the invention is to provide an improved shutter apparatus having two shutter elements actuated by springs arranged so that the spring forces do not act against each other.

Another object of the invention is to provide an improved shutter apparatus which is self-cocking.

These objects are accomplished by a shutter apparatus, according to a preferred embodiment of the present invention, which includes first and second shutter blades movable between initial and terminal positions, holding means for releasably maintaining the shutter blades in their initial and/or terminal positions, means for driving the shutter blades upon release of a shutter release mechanism, and a pair of springs drivingly associated with the shutter blades, the springs being arranged so that their forces do not act against each other.

The invention and its objects and advantages will become more apparent in the detailed description of the preferred embodiment presented below.

BRIEF DESCRIPTION OF THE DRAWINGS

In the detailed description of the preferred embodiment of the invention presented below, reference is made to the accompanying drawings, wherein corresponding parts are identified by like numerals and in which.

DESCRIPTION OF THE PREFERRED EMBODIMENT

Figure 1:
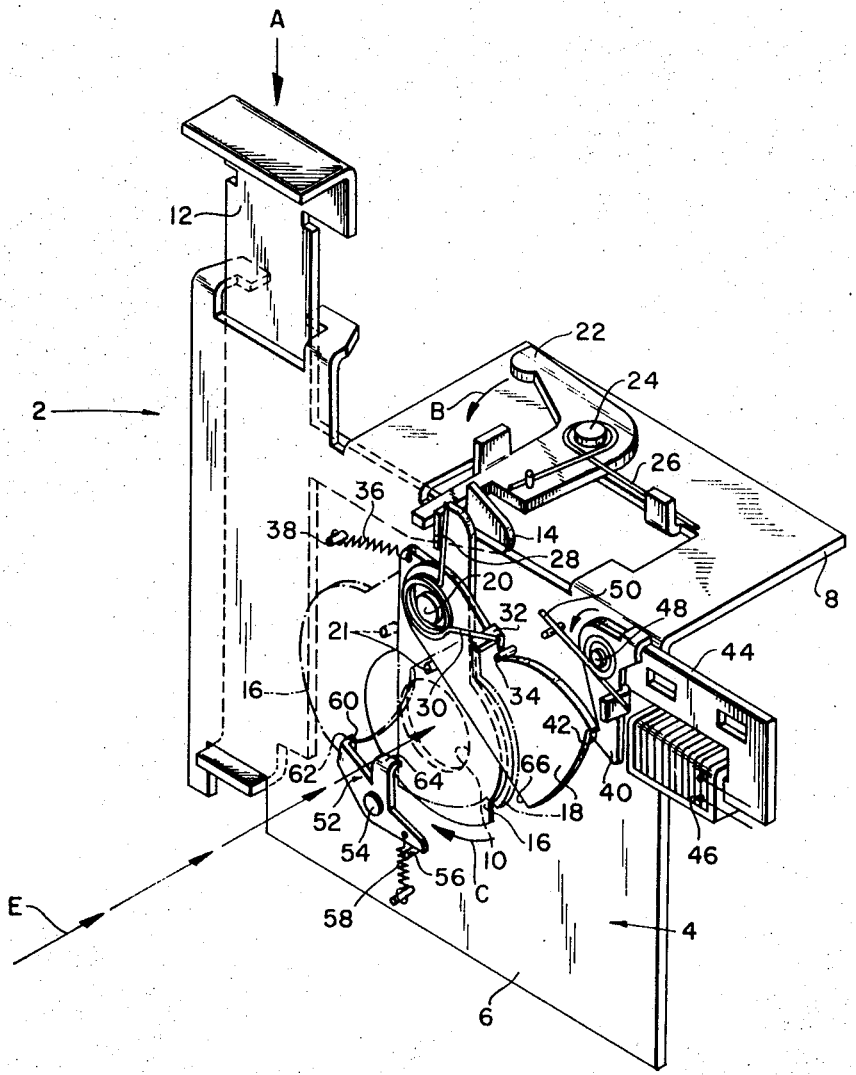
FIG. 1 is a perspective view of a shutter mechanism in accordance with the invention with the initial positions of the shutter blades shown in solid lines and the terminal positions of the blades shown in phantom.

Referring now to the drawings and in particular to FIG. 1 there is shown a shutter assembly 2 in accordance with the invention, which is adapted for use in a photographic apparatus such as a camera. Certain portions of such photographic apparatus, well known in the art, are mentioned herein without detailed descriptions, since they are not considered part of the invention. Assembly 2 includes a mounting plate 4 comprising a vertical section 6 and a horizontal section 8 which support the various elements of the assembly. Vertical section 6 of mounting plate 4 is provided with an exposure aperture or opening 10, aligned with an optical axis E, through which actinic radiation selectively passes to effect exposure of a medium such as a photographic film (not shown).

An opening shutter blade 16 and a closing shutter blade 18 are mounted on vertical section 6 of mounting plate 4 adjacent exposure aperture 10 for pivoted movement about a common pivot 20. Opening blade 16 is normally positioned in its initial or covering position, in which it is in alignment with exposure aperture 10. Opening blade 16 is rotatable about common pivot 20 between its covering position and a terminal or uncovering position wherein it is disposed wholly to one side of exposure aperture 10.

Pivotally mounted on a pivot 24 on horizontal section 8 of mounting plate 4 is a drive lever 22 which is biased in the direction of arrow B by a spring 26. Drive lever 22 is moved against its bias into the cocked position shown in FIG. 1 during film feed movement by means (not shown) associated with a film transport mechanism (also not shown), in which position it is retained by a latch 14 of a shutter release 12 movably mounted on vertical section 6 of plate 4. Drive lever 22 is adapted to engage an offset portion 28 of opening blade 16 to move the opening blade from its covering to its uncovering position under the bias of spring 26 when shutter release 12 is depressed.

Figure 2:
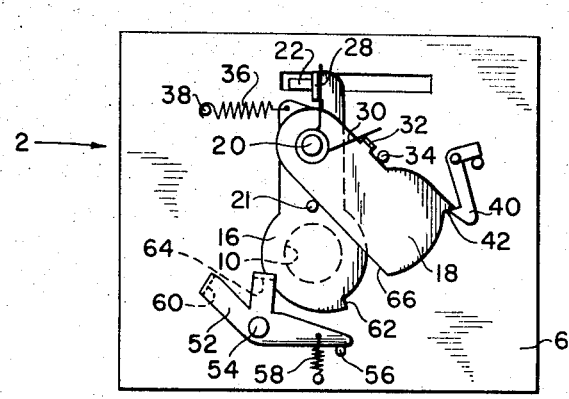
FIG. 2 is a schematic front view of the shutter mechanism of FIG. 1 showing the shutter blades in their initial positions prior to making an exposure.
Figure 3:
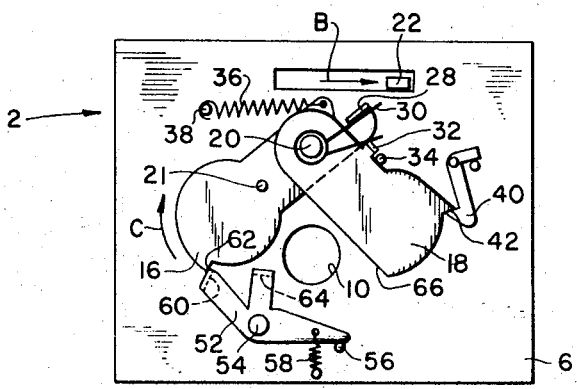
FIG. 3 is a schematic illustration similar to FIG. 2 but showing the mechanism during an exposure interval the aperture uncovered.
Figure 4:
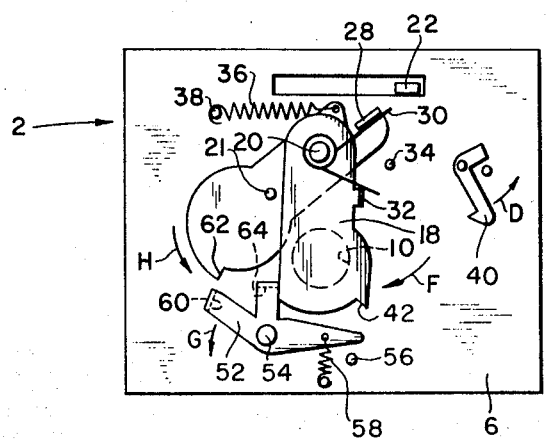
FIG. 4 is a schematic illustration similar to FIG. 2 but showing the shutter blades in their terminal positions immediately after an exposure interval has been terminated.

Closing blade 18 is rotatable about common pivot 20 between an initial or uncovering position wholly to one side of exposure aperture 10, as seen in FIGS. 1-3, and a terminal or covering position aligned with exposure aperture 10, as seen in FIG. 4. Resilient means such as spring 30 is provided for moving closing blade 18 from its uncovering to its covering position. In the form shown spring 30 is a hair spring with one leg biasing offset portion 28 of opening blade 16 counterclockwise, and with the other leg biasing a lug 32 of closing blade 18 clockwise around pivot 20.

As shown in FIGS. 1 and 2, opening blade 16 is releasably held in its initial position against a detent 34 by and elongated return spring 36 having one end attached to opening blade 16 and the other end attached to a pin 38 mounted on vertical section 6 of mounting plate 4. Closing blade 18 also is held in its initial position by spring 36, by means of a pin 21 on opening blade 16, which is adapted to abut an edge 66 of closing blade 18 during the return movement of opening blade 16 to its covering position. Closing blade 18 is additionally held in its initial position by a holding pawl 40 which engages an offset portion 42 of closing blade 18. Holding pawl 40 is pivotally mounted for rotation on a pivot 48 on a yoke 44 of an electromagnet 46 and is biased in a clockwise direction by a retaining spring 50.

A pawl 52 is rotatably mounted on a pivot 54 on vertical section 6 of mounting plate 4, and it is biased by bolt spring 58 clockwise into engagement with a detent 56. Pawl 52 includes a tab 60 which engages an offset portion 62 of opening blade 16 during movement of the blade to its uncovering position, and an arm 64 which abuts edge 66 of closing blade 18 when the blade 18 moves to its covering position.

OPERATION

Referring to FIG. 1 shutter assembly 2 is actuated by depression of shutter release 12 downwardly in the direction of arrow A. The downward movement of shutter release 12 moves latch 14 downwardly to release drive lever 22 for movement in the direction of arrow B. Drive lever 22 under the force of drive spring 26 moves the opening blade 16 via offset portion 28 in the direction of arrow C from its covering position shown in FIGS. 1 and 2 to its uncovering position shown in FIG. 3 in which the aperture 10 is opened to make an exposure. During this movement of the opening blade 16 in the direction of arrow C, return spring 36 and restoring spring 30 are simultaneously cocked as shown in FIG. 3. At the end of this opening movement offset portion 62 of opening blade 16 is latched by tab 60 of pawl 52, so that blade 16 is retained in its terminal or uncovering position, as also seen in FIG. 3.

The time interval necessary for proper exposure may be determined by control apparatus (not shown) which may take various forms well known to those skilled in the art, such as an electronic timing apparatus. Such control apparatus may be arranged to energize electromagnet 46 at the end of the exposure interval to attract holding pawl 40 in the direction of arrow D against the bias of retaining spring 50. As seen in FIG. 4, such movement of holding pawl 40 disengages the pawl 40 from offset portion 42 of closing blade 18, whereupon blade 18 moves under the force of restoring spring 30 in the direction of arrow F from its uncovering position shown in FIGS. 1–3 to its covering position over the exposure aperture 10 shown in FIG. 4, thereby terminating exposure.

When the closing blade 18 moves to its covering position over the aperture 10, an edge 66 of closing blade 18 abuts against arm 64 of pawl 52 and rotates the pawl 52 against the bias of bolt spring 58 in the direction of arrow G, so that tab 60 is disengaged from offset portion 62 of opening blade 16 and the latter is returned in the direction of arrow H to its initial position shown in FIGS. 1 and 2 under the force of return spring 36. The return motion of return spring 36 is transmitted via pin 21 to closing blade 18 and moves blade 18 against detent 34 whereat holding pawl 40 again engages offset portion 42 of closing blade 18. During the return movement in which the tension of return spring 36 is relieved, the restoring spring 30 remains in a substantially untensioned state.

In order to attain a short exposure time, a strong restoring spring 30 may be used which can be pretensioned so that the closing blade 18 will rotate rapidly in the direction of arrow F upon release by holding pawl 40 to close aperture 10.

From the foregoing, the novel features of this invention and the advantages thereof are readily apparent. A self-cocking shutter assembly utilizing two shutter blades has been provided in which the associated drive and restoring springs can be relatively strong since they do not act against each other. As a consequence, friction and spring bias differences do not adversely effect the operation of the shutter.

The invention has been described in detail with particular reference to a preferred embodiment thereof, but it will be understood that variations and modifications can be effected within the spirit and scope of the invention.

We claim:

1. Exposure control apparatus comprising:
   a. means defining an exposure aperture,
   b. opening and closing shutter blades movable between covering positions over the aperture and uncovering positions for controlling the interval of an exposure through said aperture,
   c. first spring means connected to said opening shutter blade for releasably maintaining said opening blade in its covering position,
   d. electromagnetic means releasably engageable with said closing shutter blade for releasably retaining said closing shutter blade in its uncovering position,
   e. actuatable shutter release means,
   f. drive means actuable by said shutter release means upon actuation thereof for moving said opening shutter blade from its covering position to its uncovering position to initiate an exposure interval,
   g. movable means for releasably retaining said opening shutter blade in its uncovering position,
   h. means for disengaging said electromagnetic means from said closing shutter blade,
   i. spring means effective upon disengagement of said electromagnetic means from said closing shutter blade to move said closing shutter blade to its covering position over said aperture to terminate the exposure interval,
   j. means on said retaining means adapted to engage said closing shutter blade in its covering position for moving said retaining means to release said opening shutter blade for movement by said first spring means back to its covering position, and
   k. abutment means on said opening shutter blade adapted to engage said covering shutter blade to return said closing shutter blade to its uncovering position in response to movement of said opening blade to its covering position.

2. Shutter apparatus for exposing film to scene illumination through an exposure aperture and including first and second shutter blades each movable from an open to a closed position with respect to the exposure aperture, said apparatus comprising:
   a. means for releasably maintaining said first and second shutter blades in their open positions;
   b. means for driving said first shutter blade towards its closed position;
   c. first spring means for urging said second shutter blade from its closed position toward its open position; and
   d. second spring means for urging said first shutter blade toward its closed position and said second shutter blade toward its open position;
   e. said first and second spring means being energized during movement of said first shutter blade from its closed position toward its open position.

3. Apparatus as claimed in claim 2, wherein said first and second shutter blades are mounted for rotation about a common pivot.

4. Apparatus as claimed in claim 2, wherein said second spring means is coupled between a portion of said first shutter blade and a portion of said second shutter blade.

5. Apparatus as claimed in claim 4, wherein said first spring means is substantially unenergized during return movements of said first shutter blade to its closed position and said second shutter blade to its open position.

6. Shutter apparatus for exposing film to scene illumination through an exposure aperture, said apparatus comprising:
   a. first and second shutter blades each movable from an open to a closed position with respect to the exposure aperture;
   b. drive means for moving said first shutter blade from its closed position toward its open position to thereby initiate the exposure interval;
   c. first spring means for urging said second shutter blade from its open position toward its closed position;
   d. means for releasing said second shutter blade to allow said first spring means to direct said second shutter blade toward its closed position to thereby terminate the exposure interval;
   e. second spring means for urging said first shutter blade from its closed position toward its open position against the movement of said drive means; and
   f. said first and second spring means being energized by the disposition of said first shutter blade to its open position and said second shutter blade to its open position.

7. Apparatus as claimed in claim 6, wherein said first spring means is intercoupled between said first and second shutter blades so as to be unenergized when said first and second shutter blades are disposed in their respective closed and open positions.

8. Self cocking apparatus for exposing successive portions of a movable film strip to scene illumination through an exposure aperture, said apparatus comprising:
   a. first and second shutter blades each movable between a closed and open position;
   b. drive means movable from a first position to a second position for directing said first shutter blade to its open position to initiate an exposure interval, said drive means being in an energized state in its first position to direct upon release said first shutter blade to its open position and being movable from its second to its first position in response to film advance movement;
   c. transducer means for releasably holding said second shutter blade in its open position;
   d. first spring means effective upon the release of said second shutter blade for moving said second shutter blade to its closed position to terminate the exposure interval; and
   e. second spring means effective upon movement of said second shutter blade to its closed position for returning said first shutter blade to its closed position and said second shutter blade to its open position.

9. Self cocking shutter apparatus for use in a photographic camera having an exposure aperture, said apparatus comprising:
   a. first and second shutter blades each movable between an open and a closed position with respect to the exposure aperture;
   b. drive means for moving said first shutter blade from its closed position to its open position to initiate an exposure interval;
   c. holding means for releasably maintaining said second shutter blade in its open position;
   d. first spring means effective upon release of said second shutter blade for moving said second shutter blade to its closed position to terminate the exposure interval;
   e. second spring means for urging said first shutter blade to its closed position against the movement of said drive means; and
   f. detent means disposed to engage said first shutter blade as it moves to its open position to thereby retain said first shutter blade in its open position and to dispose said second spring means in an energized state.

10. Self cocking shutter apparatus for use in a photographic camera having an exposure aperture, said apparatus comprising:
   a. first and second shutter blades each movable between an open and a closed position with respect to the exposure aperture;
   b. drive means for moving said first shutter blade to its open position to initiate an exposure interval;
   c. holding means for releasably maintaining said second shutter blade in its open position;
   d. first spring means effective upon release of said second shutter blade for directing said second shutter blade from its open position to its closed position to thereby terminate the exposure interval;
   e. second spring means for urging said second shutter blade to its open position against the movement of said drive means; and
   f. detent means flexibly biased from a first position toward a second position wherein said detent means engages said first shutter blade to retain said first shutter blade in its open position, said detent means disposed in its first position in response to the movement of said second shutter blade toward its closed position for thereby releasing said first shutter blade for movement to its closed position.

* * * * *